(12) United States Patent
Broschard

(10) Patent No.: US 12,710,133 B2
(45) Date of Patent: Aug. 18, 2026

(54) MAGNETIC RAIL WITH LASER

(71) Applicant: Stanley Black & Decker Inc., New Britain, CT (US)

(72) Inventor: Jordan L. Broschard, West Hartford, CT (US)

(73) Assignee: STANLEY BLACK & DECKER INC., New Britain, CT (US)

( * ) Notice: Subject to any disclaimer, the term of this patent is extended or adjusted under 35 U.S.C. 154(b) by 644 days.

(21) Appl. No.: 17/732,105

(22) Filed: Apr. 28, 2022

(65) Prior Publication Data

US 2022/0356988 A1 Nov. 10, 2022

Related U.S. Application Data

(60) Provisional application No. 63/186,514, filed on May 10, 2021.

(51) Int. Cl.

| | |
|---|---|
| ***G01C 15/00*** | (2006.01) |
| ***F16M 13/02*** | (2006.01) |
| *F16B 1/00* | (2006.01) |
| *F16B 47/00* | (2006.01) |

(52) U.S. Cl.

CPC ......... *F16M 13/022* (2013.01); *G01C 15/004* (2013.01); *F16B 1/00* (2013.01); *F16B 47/00* (2013.01); *F16B 2200/83* (2023.08)

(58) Field of Classification Search

CPC ............. F16M 13/022; F16M 11/2014; F16M 11/425; F16M 13/02; F16M 11/045; G01C 15/004; F16B 1/00; F16B 47/00; F16B 2200/83

See application file for complete search history.

(56) References Cited

U.S. PATENT DOCUMENTS

| | | | | |
|---|---|---|---|---|
| 747,850 A | | 12/1903 | Bihlman | |
| 1,094,651 A | | 4/1914 | Hayden | |
| 1,182,730 A | | 5/1916 | Anderson et al. | |
| 3,080,656 A | | 3/1963 | Olliff | |
| 3,363,208 A | | 1/1968 | Balet | |
| 3,741,662 A | * | 6/1973 | Pioch .................. | G01C 15/002 356/399 |
| 4,630,379 A | * | 12/1986 | Wickmann ........... | G01B 11/245 33/600 |
| 5,433,011 A | | 7/1995 | Scarborough et al. | |
| 5,465,472 A | | 11/1995 | Matoba | |
| 5,535,523 A | | 7/1996 | Endris | |
| 5,617,645 A | * | 4/1997 | Wick ..................... | G01B 11/27 250/559.23 |

(Continued)

FOREIGN PATENT DOCUMENTS

| | | |
|---|---|---|
| CN | 206424511 U | 8/2017 |
| CN | 104406576 B | 5/2018 |

(Continued)

OTHER PUBLICATIONS

EP EESR dated, Sep. 29, 2022 in corresponding EP application No. 22172201.0.

*Primary Examiner* — Yaritza Guadalupe-Mccall
(74) *Attorney, Agent, or Firm* — WOMBLE BOND DICKINSON (US) LLP

(57) ABSTRACT

A mount assembly including a rail, a mount configured to secure the rail to a surface, a laser assembly. The laser assembly includes a laser projector. The laser assembly is slidable along the rail.

10 Claims, 7 Drawing Sheets

(56) References Cited

U.S. PATENT DOCUMENTS

| | | | | |
|---|---|---|---|---|
| 5,709,034 | A | 1/1998 | Kohner | |
| 5,930,904 | A * | 8/1999 | Mualem | B60M 1/28 33/651.1 |
| 5,983,510 | A | 11/1999 | Wu et al. | |
| 6,169,290 | B1 * | 1/2001 | Rosberg | G01B 11/2408 250/559.3 |
| 6,502,319 | B1 | 1/2003 | Goodrich et al. | |
| 6,628,378 | B1 * | 9/2003 | Marangoni | G01B 11/27 33/286 |
| 6,629,370 | B1 * | 10/2003 | Sposato | B26B 29/06 33/32.2 |
| 6,696,827 | B2 | 2/2004 | Fazekas et al. | |
| 6,807,743 | B2 | 10/2004 | Odachowski | |
| 6,836,969 | B1 | 1/2005 | Bates | |
| 6,914,930 | B2 | 7/2005 | Raskin et al. | |
| 7,013,570 | B2 | 3/2006 | Levine et al. | |
| 7,027,480 | B2 | 4/2006 | Marshall et al. | |
| 7,031,367 | B2 | 4/2006 | Marshall et al. | |
| 7,059,057 | B2 | 6/2006 | Raskin et al. | |
| 7,073,268 | B1 * | 7/2006 | Etter | B27B 27/02 33/640 |
| D530,232 | S | 10/2006 | Gist | |
| 7,134,212 | B2 | 11/2006 | Marshall et al. | |
| 7,152,337 | B2 * | 12/2006 | Watts | G01B 21/30 52/749.1 |
| 7,219,437 | B2 * | 5/2007 | Dallman | B43L 7/002 33/286 |
| 7,269,907 | B2 | 9/2007 | Levine et al. | |
| 7,278,218 | B2 | 10/2007 | Levine | |
| 7,287,336 | B1 | 10/2007 | Goodrich | |
| D555,017 | S | 11/2007 | Steiner et al. | |
| 7,322,229 | B2 * | 1/2008 | Wilhelm | G01B 11/306 73/104 |
| 7,346,847 | B2 * | 3/2008 | Etter | B27B 27/06 715/740 |
| 7,448,138 | B1 * | 11/2008 | Vanneman | G01C 15/006 33/290 |
| 7,484,304 | B2 * | 2/2009 | Campagna | G01C 15/004 33/286 |
| 7,562,463 | B2 | 7/2009 | Vaes | |
| 7,805,850 | B1 | 10/2010 | Cooper et al. | |
| 7,963,044 | B1 | 6/2011 | Bartholomew | |
| 8,026,717 | B1 | 9/2011 | Biary | |
| 8,104,187 | B2 | 1/2012 | Heyer | |
| 8,141,266 | B2 | 3/2012 | Sun | |
| 8,261,459 | B2 | 9/2012 | Cooper et al. | |
| 8,302,319 | B1 * | 11/2012 | Chen | G01C 15/004 33/286 |
| 8,387,266 | B2 * | 3/2013 | Eddy | A61H 1/008 33/DIG. 21 |
| 8,407,906 | B2 | 4/2013 | Heyer | |
| 8,418,374 | B2 * | 4/2013 | Chen | G01C 15/004 33/286 |
| 8,511,635 | B2 | 8/2013 | Steffen | |
| 8,668,182 | B2 | 3/2014 | Steffen et al. | |
| 8,760,145 | B2 | 6/2014 | Tutton et al. | |
| 8,898,916 | B2 | 12/2014 | Heyer | |
| 8,966,776 | B2 * | 3/2015 | Kelly | G01C 15/12 33/286 |
| 9,069,028 | B2 | 6/2015 | Ebner et al. | |
| 9,134,447 | B1 | 9/2015 | Tin et al. | |
| D812,452 | S | 3/2018 | Matteo | |
| 10,119,817 | B2 | 11/2018 | Spaulding et al. | |
| 10,337,667 | B2 * | 7/2019 | Matthews | F16M 11/08 |
| 11,112,240 | B2 | 9/2021 | Bernsen | |
| 11,781,850 | B1 * | 10/2023 | Marshall | G01B 5/14 33/301 |
| 11,782,125 | B2 * | 10/2023 | Lai | G01B 11/14 33/299 |
| 12,276,495 | B2 * | 4/2025 | Araujo | G01B 11/306 |
| 2002/0083606 | A1 * | 7/2002 | Monteil | E01C 23/01 33/832 |
| 2002/0121025 | A1 | 9/2002 | Leite | |
| 2005/0183276 | A1 | 8/2005 | Scarborough | |
| 2005/0278966 | A1 | 12/2005 | Liu | |
| 2015/0091553 | A1 | 4/2015 | Wong | |
| 2016/0252349 | A1 * | 9/2016 | Egan | E04G 21/00 33/413 |
| 2019/0293826 | A1 | 9/2019 | Barram | |
| 2019/0331482 | A1 | 10/2019 | Lawrence | |
| 2019/0353481 | A1 | 11/2019 | Bernsen | |
| 2020/0225034 | A1 | 7/2020 | Gould et al. | |
| 2021/0088626 | A1 * | 3/2021 | Lai | F16M 11/28 |
| 2021/0190491 | A1 | 6/2021 | Khan et al. | |
| 2022/0356988 | A1 * | 11/2022 | Broschard | F16M 11/425 |

FOREIGN PATENT DOCUMENTS

| | | | | |
|---|---|---|---|---|
| CN | 108072876 | A | 5/2018 | |
| CN | 110131550 | A * | 8/2019 | F16M 11/24 |
| CN | 108980539 | B * | 9/2019 | F16M 11/048 |
| CN | 110501001 | A | 11/2019 | |
| CN | 211060921 | U | 7/2020 | |
| CN | 211401200 | U | 9/2020 | |
| CN | 110131550 | B * | 2/2024 | F16M 11/24 |
| GB | 2418740 | A * | 4/2006 | B25H 7/00 |
| GB | 2584551 | A | 12/2020 | |
| WO | 2009024381 | A1 | 2/2009 | |
| WO | WO-2018013510 | A1 * | 1/2018 | F16M 11/041 |
| WO | 2020150470 | A1 | 7/2020 | |
| WO | 2020154449 | A1 | 7/2020 | |

* cited by examiner 50
400
100
202
203
200
204
200
255
250
400
50
111
105
107

500
108
50
100
200
204
201
250
255
107
202
203
223

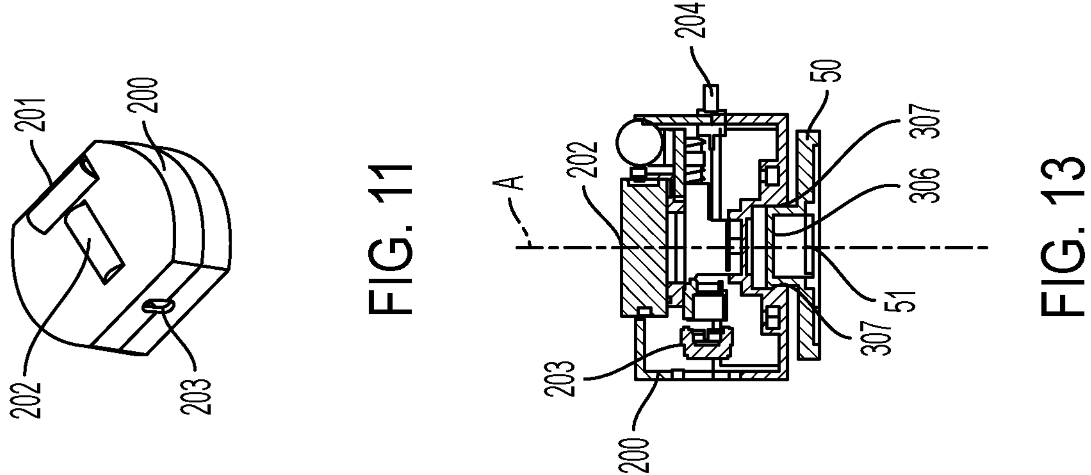
FIG. 11
FIG. 13
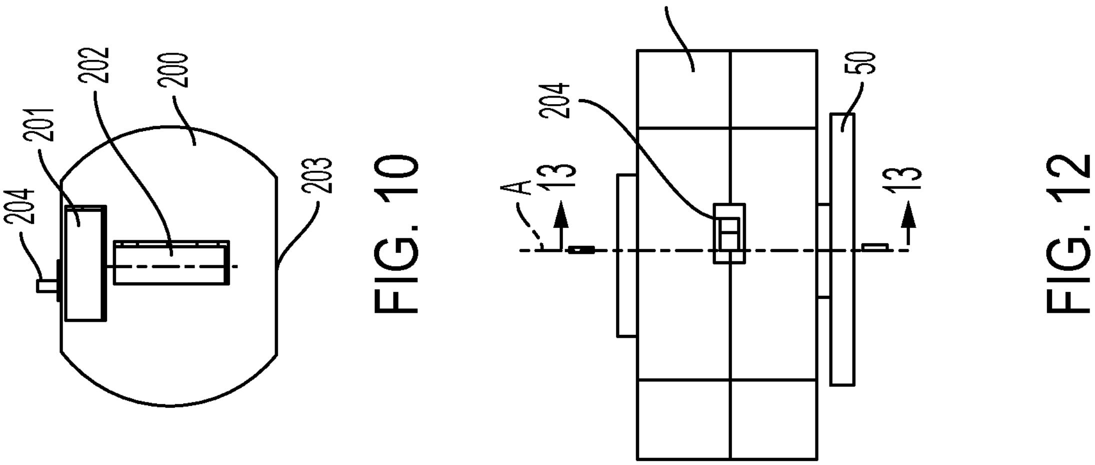
FIG. 10
FIG. 12

MAGNETIC RAIL WITH LASER

CROSS-REFERENCE TO RELATED APPLICATIONS

This application claims the benefit of U.S. Provisional Application No. 63/186,514 filed on May 10, 2021, entitled MAGNETIC RAIL WITH LASER. The entire contents of which are incorporated herein by reference.

FIELD OF THE INVENTION

The present invention relates to a rail that can be secured to a wall and a laser that can be secured to the rail.

BACKGROUND

It is desired to provide a rail that can support a slidable laser.

SUMMARY

According to an aspect there is an exemplary embodiment of a mount assembly including a rail; a mount configured to secure the rail to a surface; a laser assembly, the laser assembly including a laser projector. The laser assembly may be slidable along the rail.

The mount assembly may further include a slider, the slider mounted to the rail and the laser assembly secured to the slider.

The slider may be rotatable relative to the slider.

The mount may be secured to a rear surface of the rail.

The mount may be a magnetic mount.

The mount may be a suction cup mount.

The mount assembly may further include a first connector at a first end of the rail.

The mount assembly may further include a second connector at a second end of the rail.

The mount assembly may further include a secondary rail connected to the rail.

According to an aspect there is an exemplary embodiment of a mount assembly. The mount assembly includes a first rail and a second rail connected together to form an extended rail; a mount configured to secure the extended rail to a surface; a laser assembly, the laser assembly including a laser projector. The laser assembly may be slidable along the rail.

The mount assembly may further include a slider, the slider mounted to the extended and the laser assembly secured to the slider.

The slider may be rotatable relative to the slider.

The mount may be secured to a rear surface of the extended rail.

The mount may be a magnetic mount.

The mount may be a suction cup mount.

The laser assembly may include multiple laser projectors.

BRIEF DESCRIPTION OF THE DRAWINGS

FIGS. 1-16 illustrate various view of a magnetic rail laser mount according to an exemplary embodiment of the present application.

DETAILED DESCRIPTION OF EXEMPLARY EMBODIMENTS OF THE INVENTION

An exemplary embodiment of a magnetic mount laser rail is shown in FIGS. 1-15.

Figure 1:
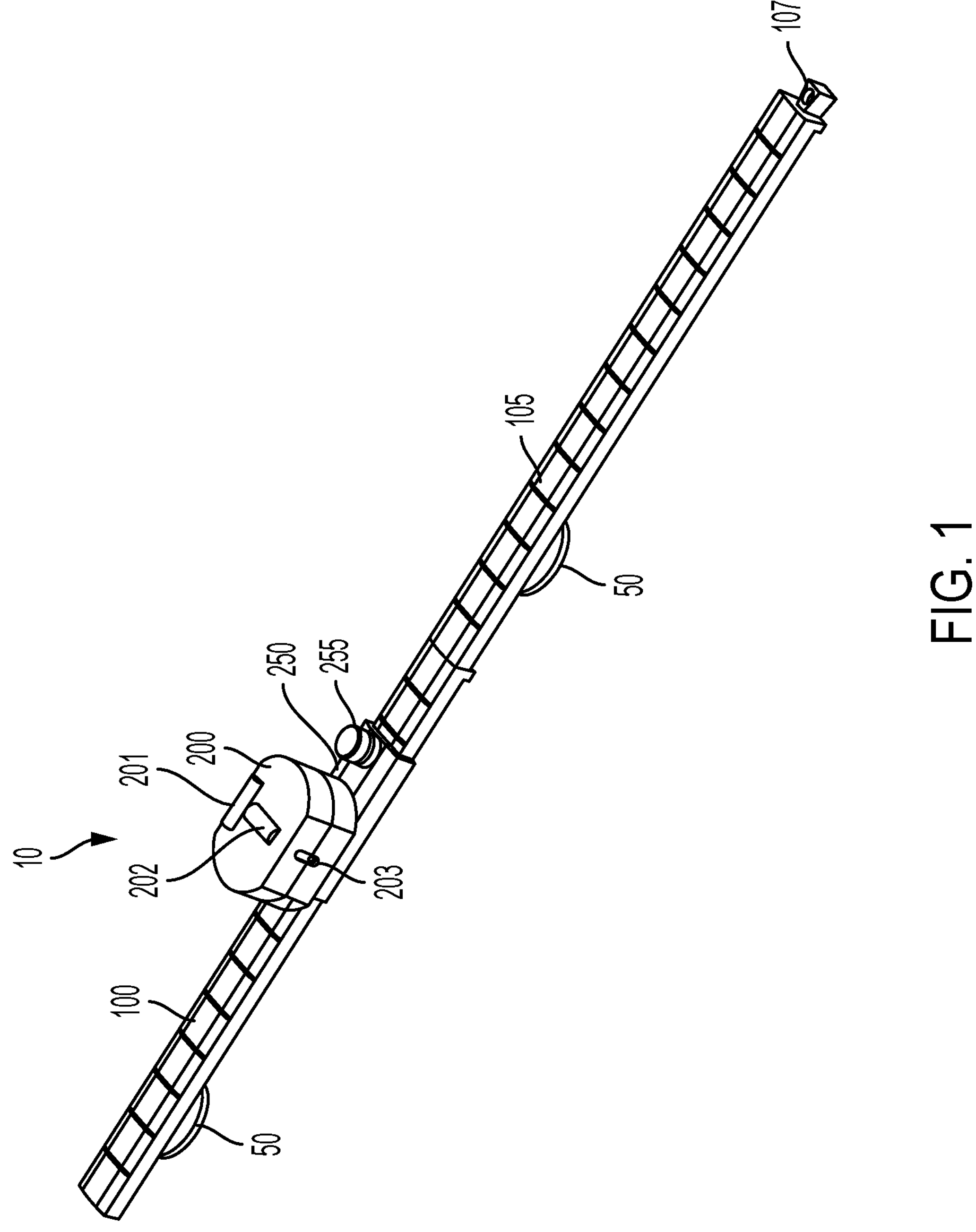

FIGS. 1-15 illustrate an exemplary embodiment of a magnetic mount rail with laser. FIG. 1 is a front perspective view of a magnetic mount laser rail system 10 according to an exemplary embodiment of the present application. As shown in FIG. 1, the system 10 includes a first rail 100 and a second rail 105. Each of the first rail 100 and second rail 105 include a mount 50. In this case, the mount 50 is a magnetic mount comprising a magnet housed in a plastic holder. Other mounts are possible. For example, the mount 50 could instead be a suction cup, an adhesive or a pin or plurality of pins.

When the mount 50 is a magnetic mount, the mount 50 will help identify the location of a stud by being drawn to drywall nails or screws in a stud behind a wall. If another type of mount 50 is used, a stud finder my be attached to the mount. The stud finder may be adhered to the mount, may be separately provided and slidable on the rails 100, 105 or may be on the slider 205, described later.

As further shown in FIG. 1, there is a slider 250. The slider can slide along the rails 100 and 105. A stopping screw 255 is included with the slider 250 to position the slider 250 at a particular spot. In particular, the screw 255 can be unscrewed to allow movement of the slider 250. When the slider 250 is in a desired location, the stop screw 255 can be screwed in against the rail 100, 105 and secure the slider 250 in place.

A laser assembly 200 is mounted on the slider 250. The laser assembly includes two bubble vials 201 and 202. The bubble vials 201, 202 are perpendicular to one another and allow a user to place the rails 100, 105 at a horizontal or vertical level. The laser assembly 200 also includes a laser beam output 203 that outputs a laser line. The laser beam output 203 may include a laser diode that produces a laser beam and a prism or other optics to form a line. If the rail system 10 is mounted vertically on a wall, the laser beam output 203 projects a horizontal line on the wall if the laser level assembly 200 is in the position shown in FIG. 1. If the rail system 10 is mounted horizontally on a wall, the laser beam output 203 projects a vertical line on the wall if the laser level assembly 200 is in the relative orientation to the rails 100, 105 as shown in FIG. 1. The laser level assembly 200 may be fixed or may be rotatable relative to the slider 250. Additionally, the laser beam output 203 may be directed at different angles or there may be more than one laser beam outputs 203. For example, there could be aligned laser beam outputs 203 on either side of the laser level assembly 200. There could also be laser beam outputs 203 at 45 degree angles.

Figure 2:
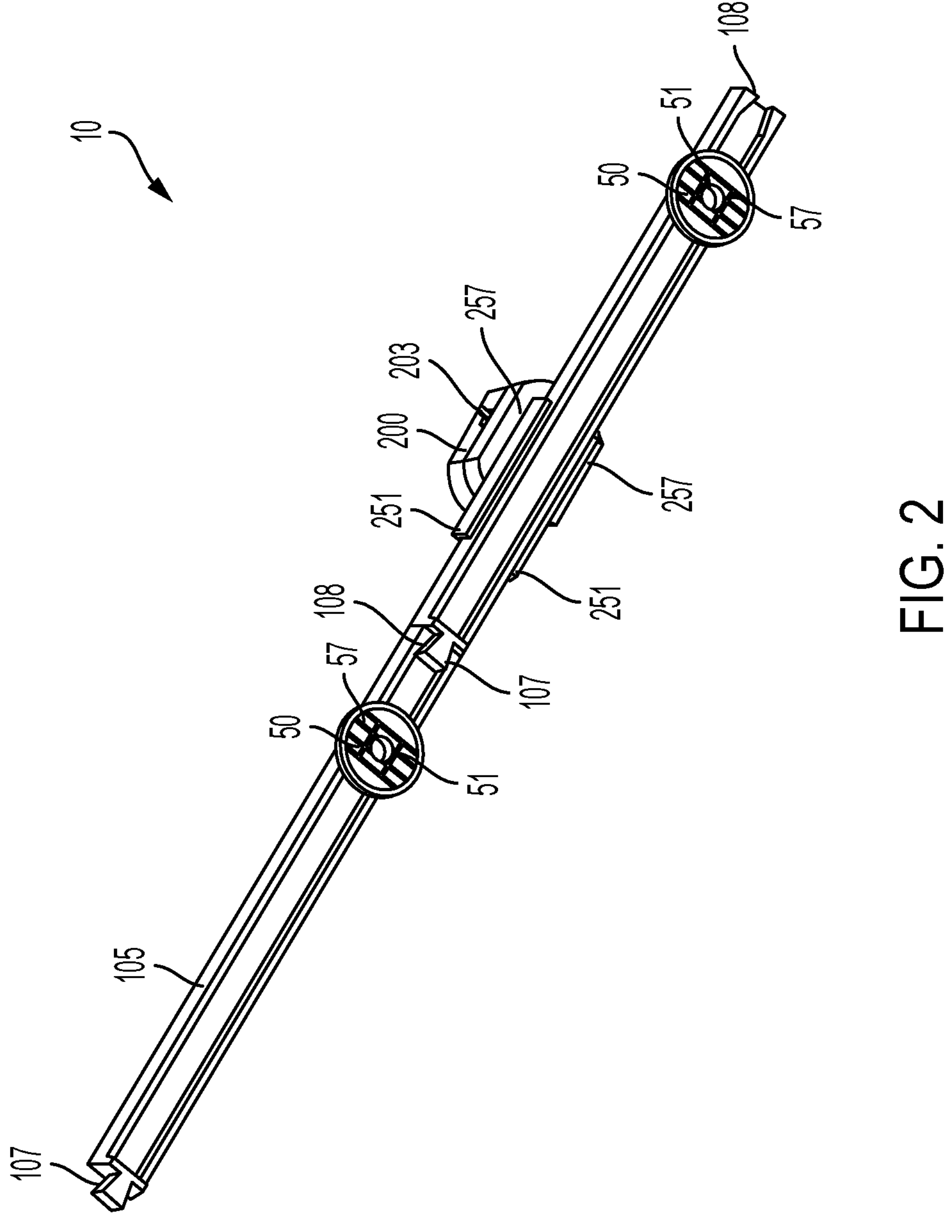

FIG. 2 is a rear perspective view of the assembly 10. As shown in FIG. 2, the slider 250 has sides 251 and overlap portions 257. The overlap portions 257 project underneath the rails 100, 105 to secure the slider 250 to the rails.

As is also shown in FIG. 2, the mounts 50 include a plastic housing 57 and a magnet 51 held by the plastic housing 57. In the exemplary embodiment, there is one mount 50 on rail 105 and one mount 50 on rail 100. In other embodiments, there may be multiple mounts on each rail 100, 105. For example, there could be a mount 50 at each end of rail 100. Additionally, in the exemplary embodiment, the mounts 50 are fixed in place. In other embodiments, the mounts 50 may be movable along the bottoms of the rails 100, 105 to different locations. They can be secured at the different locations by detents or a stopping screw similar to the stopping screw 255.

Figures 14, 15, 16:
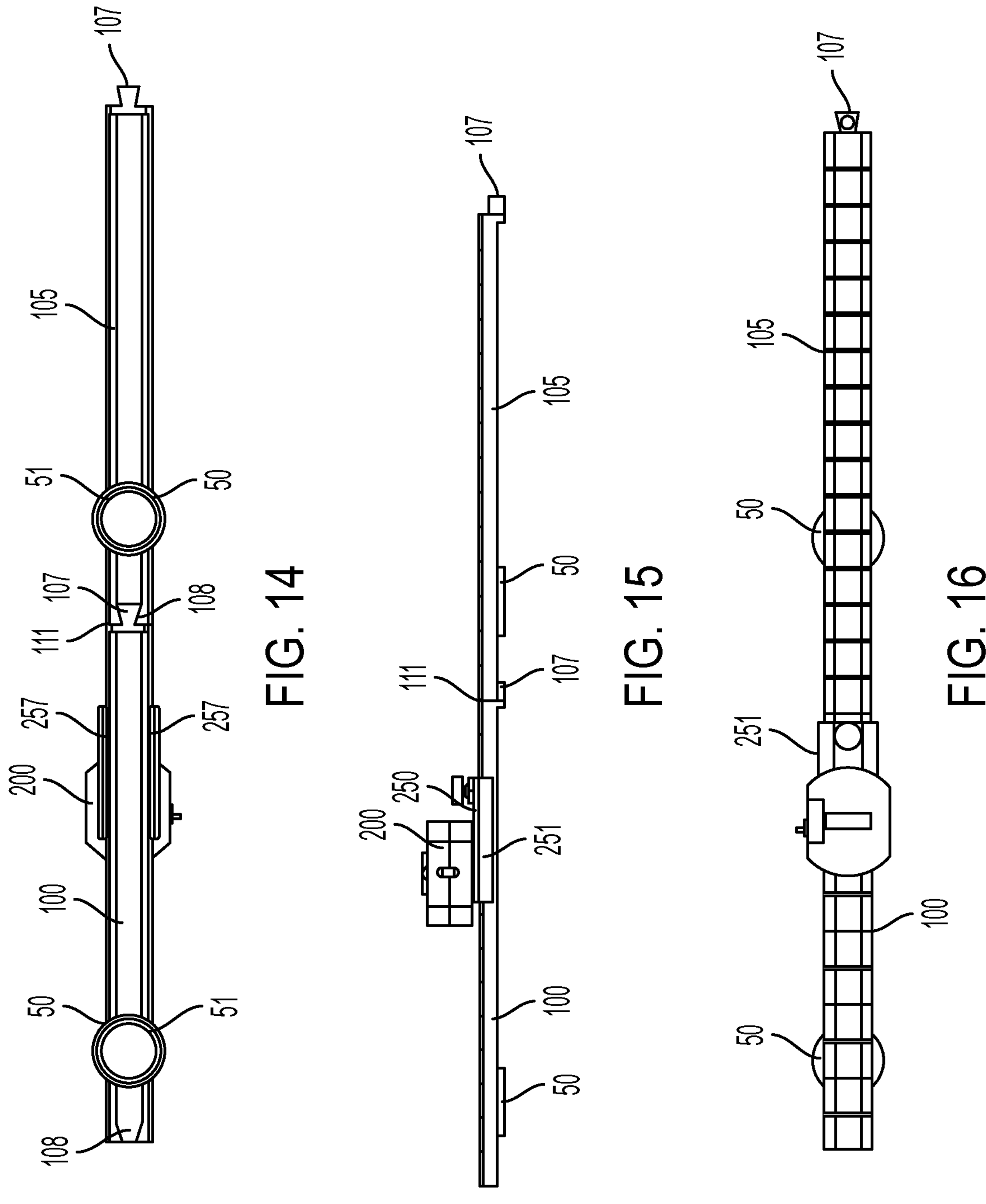

As further shown in FIG. 2, the rails 100 and 105 have a connection portion 107 at a first end and a connection portion 108 at a second end. The connection portions 107 fit into connection portions 108 to secure multiple rails 100, 105 together. The exemplary embodiment illustrates two rails 100, 105, but there may be additional rails with similar connection portions. The connection portion 108 is a pocket on the underside of the rails. Accordingly, the front of the rails 100, 105 show a smooth transition at a transition point, as shown by the transition line 111 in FIG. 4. FIG. 14 is a rear plan view of the assembly 10. FIG. 14 illustrates the rear side connection of 107 and 108. As shown by the left side of FIG. 14, the connection portion 108 does not project out of an end of the rail 100.

Figures 3, 4:
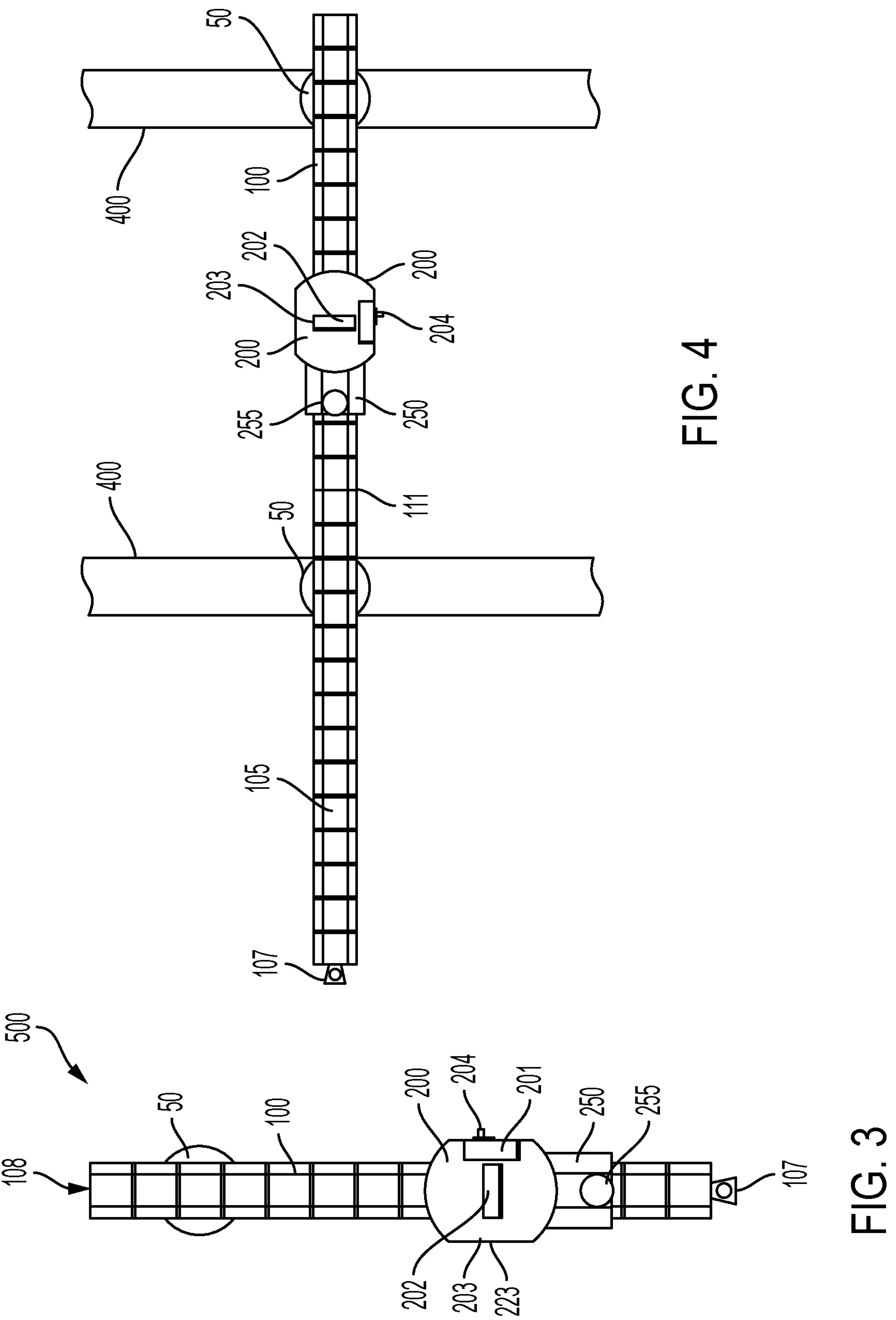

FIG. 3 is an illustration of the rail 100 mounted vertically on a wall 500. As shown in FIG. 3, the rail 100 is mounted by itself and not connected to a second rail 105. The single mount 50 includes a magnet with sufficient strength to hold the rail 100 and laser assembly 200. In the position of FIG. 3, a horizontal laser beam 223 is projected onto the wall 500.

FIG. 4 is an illustration of the rail assembly 10 mounted horizontally. The mounts 500 are each aligned with a stud 400. The studs 400 may be exposed studs or may be behind a wall such as drywall. In the position of FIG. 4, the laser output 203 will output a vertical beam, in this case vertically upward. The assembly 10 could be flipped to project a vertically downward beam. Additionally, as previously mentioned, there may be multiple laser lines output to project both vertically upwardly and vertically downwardly.

Figure 8:
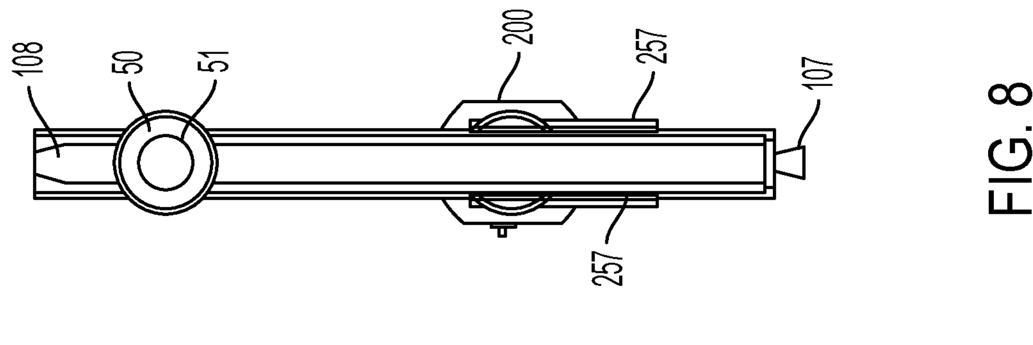
Figure 7:
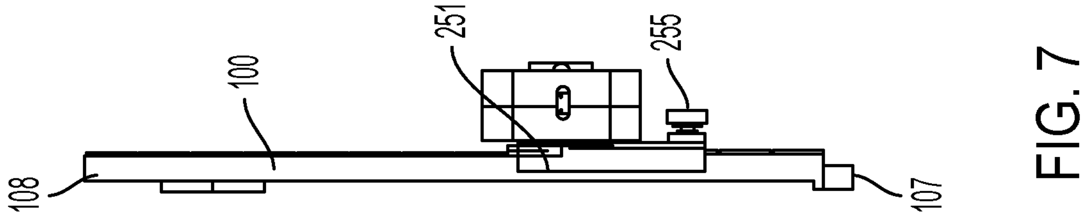
Figure 6:
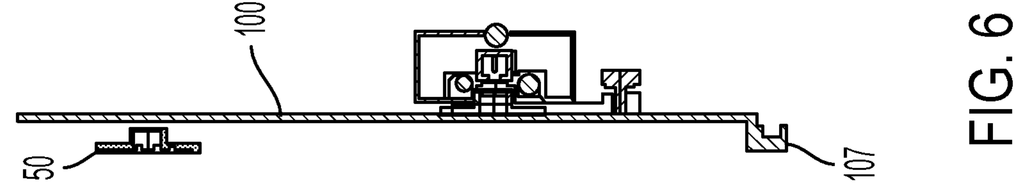
Figure 5:
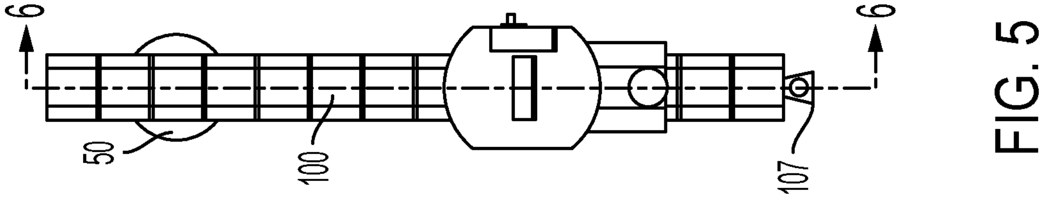
Figure 9:
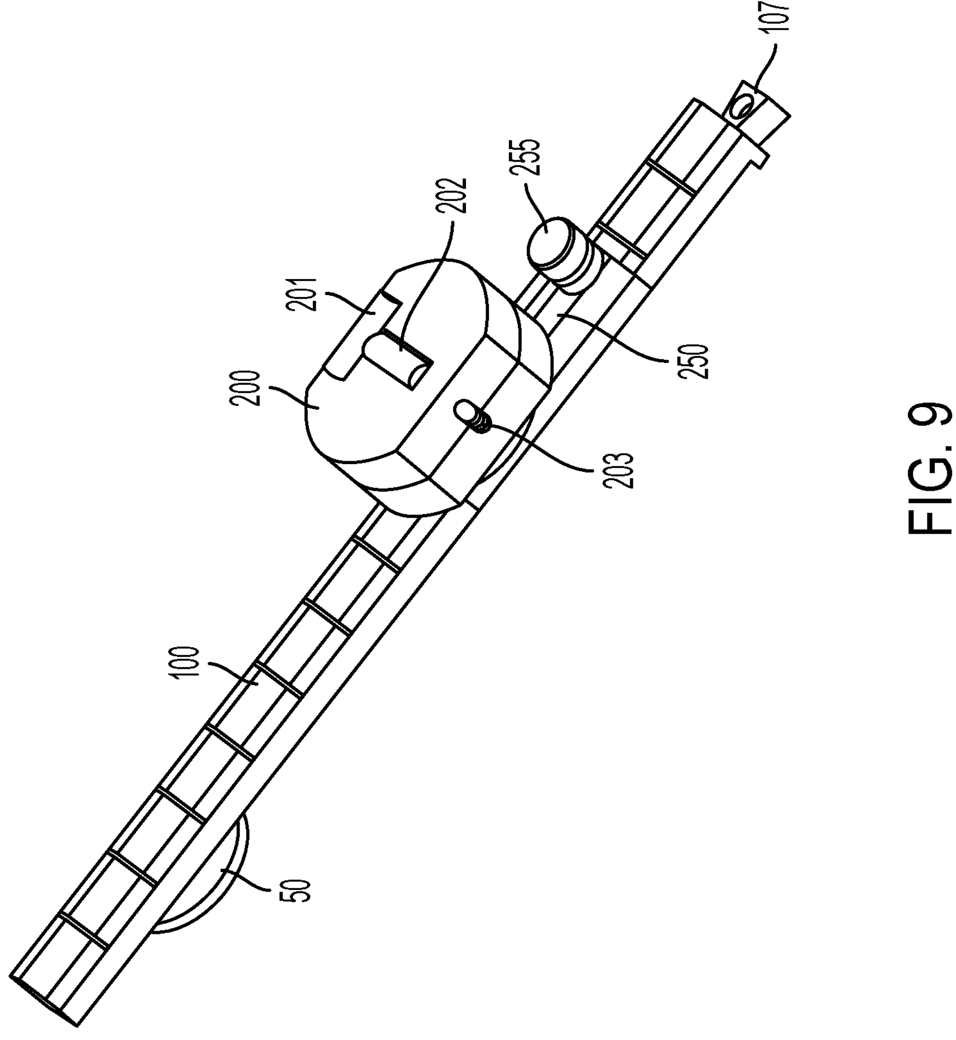

FIG. 5 is a front plan view of the rail 100 and laser assembly 200. FIG. 6 is a cross-sectional side view of the rail 100 and laser assembly 200. FIG. 7 is a plan side view of the rail 100 and laser assembly 200. FIG. 8 is a rear plan view of the rail 100 and laser assembly 200.

FIG. 10 is a front plan view of the laser assembly 200. As shown, element 204 is a switch to activate and deactivate the laser beam output 203. FIG. 11 is a perspective view of the laser assembly 200. FIG. 12 is a side plan view of the laser assembly 200 and FIG. 13 is a cross-sectional side view of the laser assembly 200.

The laser assembly 200 may be rotated about the axis A. As shown in FIG. 13, the laser assembly 200 may be on a mount 306. The mount 306 may have detents 307 and the laser assembly 200 may have corresponding recesses to receive the detents 307. The recesses may be spaced to allow the laser assembly 200 to rotate at particular increments. For example, every 45 degrees. This would allow eight different pre-determined positions for the laser assembly corresponding to eight different laser line projections. For example, if the rail assembly 10 were mounted vertically, the laser beam 203 could be projected as a line in a vertically upward direction, vertically downward direction, horizontally left and horizontally right position, as well as a 45 degree angles between the same.

FIG. 14 is a rear plan view of the assembly 10. FIG. 15 is a is a side plan view of the assembly 10. FIG. 16 is a top plan view of the assembly 10.

While the invention has been described by way of exemplary embodiments, it is understood that the words which have been used herein are words of description, rather than words of limitation. Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. It is to be understood that the present disclosure contemplates that, to the extent possible, one or more features of any embodiment can be combined or exchanged with one or more features of any other embodiment.

What is claimed is:

1. A mount assembly, comprising:

a first rail and a second rail connected together to form an extended rail;

a mount at least partially recessed within the extended rail and configured to secure the extended rail to a surface; and a laser assembly, the laser assembly comprising a laser output configured to output a laser line;

wherein the laser assembly is slidable along the extended rail.

2. The mount assembly of claim 1, further comprising a slider, the slider mounted to the extended rail and the laser assembly secured to the slider.

3. The mount assembly of claim 2, wherein the mount is secured to a rear surface of the first rail, and the mount assembly further comprises a mount at least partially recessed within the extended rail and secured to a rear surface of the second rail.

4. The mount assembly of claim 3, wherein the mount is a magnetic mount.

5. The mount assembly of claim 3, wherein the mount is a suction cup mount.

6. A mount assembly, comprising:

a rail;

a mount configured to secure the rail to a surface;

a laser assembly, the laser assembly comprising a laser output configured to output a laser line;

wherein the rail has a rear and a front opposite the rear;

wherein the mount extends at least partially through the rear of the rail;

wherein the laser output is slidable along the front of the rail; and a first connector at a first end of the rail and a second connector at a second end of the rail, wherein a secondary rail is attached to one of the first connector or the second connector to form an extended rail.

7. The mount assembly of claim 6, wherein the laser assembly comprises a bubble vial.

8. The mount assembly of claim 6, further comprising a slider, the slider mounted to the rail and the laser output secured to the slider such that the laser output is slidable along the rail.

9. The mount assembly of claim 6, wherein the mount is a magnetic mount.

10. The mount assembly of claim 6, wherein the mount is a suction cup mount.

* * * * *